Aug. 22, 1967  G. CHARPAK ETAL  3,337,733
IMAGE AMPLIFYING DEVICE HAVING A PULSE GENERATOR APPLIED
TO PARALLEL ELECTRODES SEPARATED BY AN IONIZABLE GAS
Filed Dec. 19, 1963

Inventors
Georges Charpak & Louis Massonnet
By
Littlepage & Quaintance

United States Patent Office
3,337,733
Patented Aug. 22, 1967

3,337,733
IMAGE AMPLIFYING DEVICE HAVING A PULSE GENERATOR APPLIED TO PARALLEL ELECTRODES SEPARATED BY AN IONIZABLE GAS
Georges Charpak and Louis Massonnet, Geneva, Switzerland, assignors to Etablissement Public: Centre National de la Recherche Scientifique, Paris, France, a corporation of France
Filed Dec. 19, 1963, Ser. No. 331,701
Claims priority, application France, Dec. 27, 1962, 919,863
9 Claims. (Cl. 250—83.6)

The present invention relates to the amplification of radiations, more particularly for radioscopy and radiography, by means of X-rays or neutron radiations.

In the X-ray radiography techniques, use is generally made of a fluorescent screen; or else, directly, of a film for the detection of the space distribution of radiation traversing the object the structure of which is being analyzed. In the first case, it is obviously desirable to resort to a detecting screen capable of emitting the maximum of light for a given incident energy. The emissive power of such screen is nevertheless comparatively limited. This is a serious drawback in the case of the radioscopy of human beings, wherein, on account of the fact that X-ray doses received by the patient examined are detrimental to his health, the emission tubes have their output limited as much as possible, this being however insufficient for not considerably limiting the use of this otherwise highly useful inspection method.

In the case of X-rays or neutrons in industrial radiography, the radiation sources employed have in general a very high intensity, currently of the order ranging from one curie to several tens of curies, which makes it necessary to apply very costly methods for their handling and their storage: therefore it is obviously highly desirable to provide means adapted to make available less powerful sources, while obtaining, nevertheless, satisfactory images.

To remedy the absence of brilliance of the usually available fluorescent screens, the tendency is to make use of brightness amplifiers. These are adapted to provide, on the fluorescent screen a more brilliant image than that which is normally obtained on a X-ray detecting screen, but they present the drawback both that they are very costly on account of their complexity, and they provide an image of small size, which, in some cases, renders difficult the visual reading of details, however high is the quality of their definition.

Therefore an object of the present invention is to provide a radiation amplifier the screen of which has none of the deficiencies of the conventional ones. Accordingly, the new screen; of a simple and consequently economical construction, may have any dimensions and shapes and is adapted to convert into light of sufficient intensity to be visible the detection of each quantum of light, or of any incident radiation particles absorbed. The efficiency for each quantum or particle is therefore considerably higher than that of an ordinary screen, to such extent that it may sometimes be necessary to reduce brilliancy in order to enable one to estimate a wide range of intensities, without saturation effect.

The amplifying device according to the invention provides a screen which comprises two oppositely facing electrodes, in parallel relationship to and at a small distance apart from one another, whereby one of said electrodes, named target electrode consists of a thin foil of a material having a low absorption coefficient with respect to the radiation to be amplified, said foil being coated, on the side facing the other electrode, with a thin layer of a metal presenting, on the contrary, a high absorption degree or rate for said radiation, and the other electrode is formed as a transparent electrode consisting of a conductive lattice or net opposing as little an obstacle as possible to the passage of the light rays, said network being stretched upon or in the immediate vicinity of a plate of a material transparent to the light rays and located on the opposite side to the target electrode with respect to said lattice, the target electrode and said transparent plate being connected to one another by means of a rigid, gastight frame; the space defined inside said frame being filled up with at least one of the inert gases having a small amount of a gaseous halogen, the metal layer of the target electrode and said conductive lattice being connected, respectively, on one hand to the terminals of a D.C. voltage source and, on the other hand, to a source of short voltage pulses: the D.C. voltage and the peak voltage of the pulses are such that the total voltage supplied by both sources at the instant of the passage of a pulse is higher than the breakdown voltage in the gaseous mixture enclosed between the electrodes. The electrodes are preferably spaced apart, as a rule, by a distance between 1 mm. to 1.5 cm.

The screen thus formed is inserted between the radiation source and the observer, which may be either the human eye or a simple camera, with the target electrode being directed towards said source, in front of which the body or object to be examined is placed. When an X-ray quantum, for instance, will strike the target electrode, after having traversed the carrier foil, it will be absorbed by the layer covering the latter and will tear out therefrom an electron capable of leaving the layer on account of the reduced thickness of the same. When such an electron occurs in the space included between the electrodes, upon the application of a voltage pulse, it will be accelerated, thus determining, by ionization of the gaseous mixture contained in said space, an avalanche of electrons which, if the total voltage applied between the electrodes leaves a positive ion cloud and produces light sufficiently high, is visible through the transparent electrode. Under these conditions, and in the case of radioscopy for instance, a perfectly visible image will result even though the intensity of the source is comparatively low; such image may moreover be readily photographed by means of any conventional camera.

Experiment shows that the presence of a halogen in the filler gas enables one to slow down the electron discharge and to operate under the desired conditions to obtain the result desired which is impossible to achieve in the absence of the halogen.

The low D.C. voltage permanently applied to the electrodes is adapted to remove, between two successive pulses the charges due to the avalanches. This pulse voltage may be comprised between 10 and 50 volts approximately. By selecting the polarity of this scanning voltage in such a manner that it becomes added to the pulse voltage, it is possible to decrease the latter correspondingly.

The sheet of material of low absorption coefficient of the target electrode, and which serves only as a simple carrier, must be as thin as possible, while having a sufficient resistance to be self-supporting, or else be taut over a suitably shaped frame. In the case of an X-ray or neutron radiation amplifier screen, a material such as aluminium may advantageously be utilized, although any other metal or material, particularly a plastic material, enabling extremely thin foils to be prepared and presenting a low absorption coefficient for the radiations to be amplified, may as well be employed.

The metal coating applied on said carrier foil or sheet is preferably, for amplifying X-rays, a gold layer deposited for instance by thermal evaporation under vacuum or by an electrolysis process. Any other suitable metal may however also be taken into consideration, such as silver or iron. For the amplification of neutrons in neutron radiography, a layer of boron may be used. In both cases, account will be taken of the well known absorption properties of the X-rays and neutrons by the materials according to their atomic number and the energy of the radiations used. It is also possible to achieve an amplification of light rays by making use of a photosensitive metal layer such as caesium. In this latter case, the carrier foil must, obviously, be transparent, and is then advantageously formed of glass or of some transparent plastic material.

The conductive lattice or net above mentioned adapted to constitute the other electrode consists advantageously of a metal grid or any known type. Such grids are currently available, the transparence for light of which may attain about 90%. The lattice may be a grid having a mesh of about $5/100$ of a mm.

The transparent plate on which the grid is taut, may be a simple glass plate.

The rare gas filling up the space enclosed between the electrodes may be, for instance, neon, krypton, argon, xenon and helium, taken alone or as mixture thereof. Neon, or a mixture of neon and helium in any suitable proportion, is particularly advantageous. To this gas or to this gas mixture is then added a halogen, such as gaseous chlorine, bromine or iodine vapours. Traces of the halogen are sufficient according to the invention; satisfactory results are obtained by introducing into the enclosed space iodine crystals: the iodine vapour being thus balanced by the solid phase, which, at the atmospheric pressure-desirable, represents a content of about 0.2% of iodine vapour. While the use of iodine crystals is not limitative, the use thereof does simplify the maintenance of tight fits and mechanical resistance problems at desirable pressures. The bromine and the chlorine may be employed in amounts equivalent to those of the iodine.

The voltage pulses applied between the electrodes which may be either separate pulses or pulse trains, have a length conveniently comprised between $2.10^{-7}$ and $10.^{-5}$ seconds, and preferably between $5.10^{-7}$ and $3.10^{-6}$ seconds, with a repetition or recurrence frequency which may attain up to and above 10,000 pulses in pulse trains per second.

The optimum frequency must be experimentally determined for each specific case, while an accurate minimum cannot be determined in an absolute manner; tests have shown that frequencies as low as 50 cycles per second—and even lower—may be used.

This holds also for the total voltage to be applied to the electrodes upon the passage of a pulse through the source thereof and through the source of the scanning voltage. As already indicated, this total voltage must be higher than the breakdown voltage in the gaseous mixture, which depends, in particular, on the nature of the basic gas or gaseous mixture, on the distance between electrodes and on the constitution of the latter, it being desirable that this voltage should exceed said breakdown voltage only by a small value. When the total voltage applied between electrodes upon passage of a pulse is not too high relative to the lower threshold, and although the discharge is constituted by a light column connecting the two electrodes, it is effectively possible to perceive only the point where said column strikes one of the electrodes, since it was noted, more particularly in the case when the screen filling gas is neon or a mixture of neon and helium, that the cathode presents, at the point of impact of the column, a brilliant red point which does not show on the opposite electrode.

The invention will now be fully described, in the case of a device adapted to be used in X-ray radioscopy or radiography, by way of example, with reference to the appended drawings, wherein.

Figure 1:
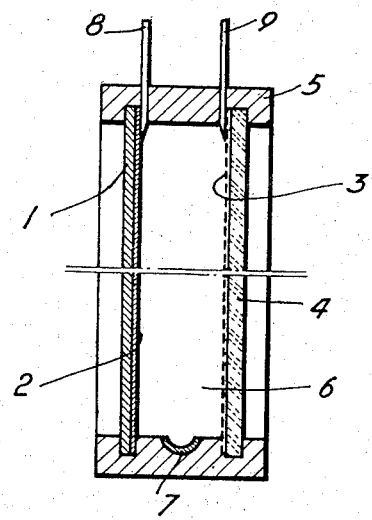
FIGURE 1 is a diagrammatic cross-sectional view of the screen proper according to the invention.

As shown in FIGURE 1, the screen according to the invention comprises, on one hand, a target electrode consisting of a carrier foil 1 of a metal such as aluminium having a thickness of $1/100$ of a mm., and onto which is applied a layer 2 of gold of a thickness of 1 micron, obtained by thermal evaporation under vacuum, and, on the other hand, a transparent electrode consisting of a stainless steel grid 3 forming a wire netting or lattice obtained by means of wires of a diameter of $5/100$ mm., with a mesh opening of 1 mm., said grid being applied onto a glass plate 4. These two electrodes are connected together by a sealed frame 5, the space 6 enclosed between the electrodes and said frame being filled up with a mixture of neon and helium, containing 65% neon, at the atmospheric pressure. In addition, iodine crystals are placed in a cup 7 and ensure, at the normal temperature, the presence of about 0.2% iodine vapour in said gaseous mixture. Finally, conductors 8 and 9 pass through frame 5 and are connected, respectively, to layer 2 of the target electrode and to the grid 3 of the transparent electrode, to effect the connection with the supply circuit of the screen. The dimensions of frame 5 are such that the width and height of chamber 6 are 30 cm., respectively, with a thickness of 1.5 mm.

Figure 2:
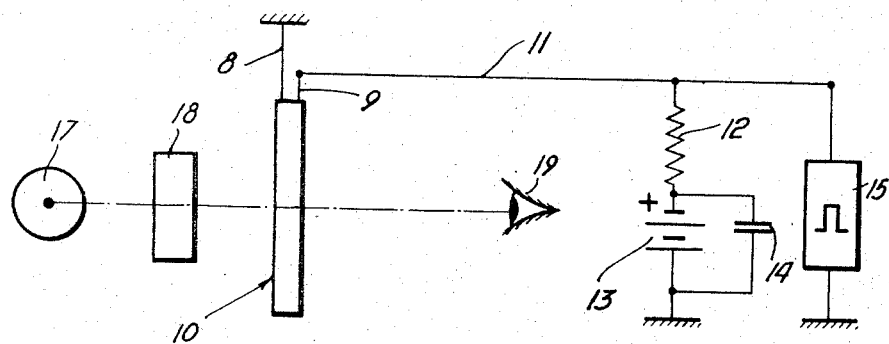
FIGURE 2 is a connection diagram of the supply arrangement for said screen.

As shown in FIGURE 2, wherein the screen is generally indicated by the reference number 10, conductor 8 is grounded, whereas conductor 9 is connected in parallel, through a conductor 11, on one hand through a resistance 12 of 10 kilo-ohms, to the positive terminal of a 250 volt-battery 13, the other terminal of which is grounded, across which is connected in parallel a limiting capacitor 14 having a capacitance of 1 microfarad; on the other hand, the positive terminal of battery 13 is connected to the output of a pulse generator 15 arranged to produce square-wave pulses of a duration of one microsecond and a pulse-amplitude of 300 volts, with a repetition or recurrence rate of 2000 pulses per second.

A source of X-rays is shown at 17, the object to be radiographed at 18 and at 19 the observer watching the distribution of the light points on the screen.

The effectiveness of the apparatus described depends on the absorption probability of the X-rays in the target-electrode on in the gas. It is strongly dependent on the energy of the X-rays, as for any screen. It is however essential to note that the apparatus is effective only during the period of time equal to $nT$, where $n$ is the number of pulses per second and $T$ the duration of each pulse. In the example described hereinabove, the effective time is 0.2% of the total time. This ratio may be substantially improved, in the case of X-ray tubes, by pulsing the X-ray source proper and by adapting the repetition rate of the pulses produced by generator 15 to the pulse frequency of said tube. It is possible to use, for instance, a pulsed X-ray tube, in a manner known per se, at a frequency of 100 pulses per second, an equal repetition rate being adopted for the pulses derived from generator 15.

Even at reduced effectiveness, in the absence of the pulsed source, the increase of the light efficiency is such that it is possible to carry out radiographies with intensities of more than a thousand times lower than those currently used. The use of a screen according to the invention appears as enabling an extensive utilisation of isotopic X-ray sources, with limiting the necessary intensity thereof.

It is to be understood that the embodiment of the device as described and illustrated is given only by way of a non limitative example, and that variations and modifications may be brought thereto without departing from the spirit and scope of the invention, in particular as relates to the shape and dimensions of the screen, the voltages applied to the electrodes, the shape of the voltage pulses, which may, if desired, be substituted by pulse trains, as well as the nature of the gas or gas mixture contained between the electrodes and that of the halogen utilized.

What we claim is:

1. A radiation amplifier device for radioscopy, radiography and neutron-radiography detection, comprising a gas-tight chamber, having two parallel plane electrodes spaced apart from one another, one of said electrodes having a layer of a high absorption coefficient with respect to said radiations which emits charged radiation upon absorption of said first radiations to produce electrons in the gas within said chamber, and the other electrode being transparent to light rays, in said chamber, a gaseous mixture consisting of a very small amount of a halogen and of at least one rare gas of the group consisting of neon, krypton, argon, xenon and helium, a D.C. source of voltage below the breakdown voltage of said gaseous mixture having a positive and a negative terminal, a limiter capacitor connected in parallel across said source, a short-pulse generator connected in parallel with said D.C source, an electrical connection between said transparent electrode and the positive terminal of the source in series with said generator, the negative terminal being connected to the electrode having a layer of high absorption coefficient, said voltage supplied, respectively, by said generator and said source being such that their sum, at the instant of the passage of a pulse, is higher than the breakdown voltage of the gas enclosed in said tight chamber.

2. A radiation amplifier device for radioscopy, radiography and netron-radiography detection, comprising two gas-tight parallel supports spaced a certain distance apart from one another, a first and a second plane, parallel, electrodes, arranged in tight relationship in said supports, thus forming a tight chamber enclosed between said supports and said two electrodes, said first electrode consisting of a thin outer foil of a low absorption power for the radiations to be amplified and carrying, on its inner surface, a thin deposited metal coating highly absorbant for said radiations which emits charged radiation upon absorption of said first radiations, said second electrode including a conductive lattice substantially open to the passage of the light rays and stretched taut in the close vicinity of a plate which is transparent to said light rays; in said chamber: a gaseous mixture consisting of a small amount of a gaseous halogen and at least one rare gas from the group consisting of neon, krypton, argon, xenon, and helium, a D.C. source of electric current having a negative terminal connected to the inner metallic coating of said first electrode and a positive terminal connected to said conductive latttice, and a pulse generator in parallel with said source, said voltage supplied, respectively, by said generator and said source being such that their sum, at the instant of the passage of a pulse, is higher than the breakdown voltage of the gas enclosed in said tight chamber.

3. A device according to claim 2 wherein said first electrode includes a thin foil of low absorbing power for the radiations to be amplified and stretched taut between supports, said foil being coated with a deposited metal coat of a high absorbing power for said radiations, said metal being a member of the group consisting of gold, silver, iron, boron, caesium, said second electrode being formed of a metal grid transparent up to 90%, applied on a plate of material transparent to the light rays.

4. A device according to claim 1, wherein said tight chamber contains an amount of gaseous halogen ranging from traces and up to 1%.

5. A device according to claim 1, wherein said tight chamber contains iodine vapour derived from iodine crystals positioned in said chamber.

6. A device according to claim 1, wherein the pulse duration is comprised between about $2.10^{-7}$ and about $10^{-5}$ seconds, with a repetition frequency comprised between about 50 and about 10,000 pulses, in pulse trains, the voltage of the D.C. source being comprised between 10 and 500 volts.

7. A radiation amplifier device for radioscopy, radiography and neutron-radiography detection, comprising two gas and radiation tight parallel supports spaced apart a distance of about 1 to 10 mm. from one another, a first and a second plane, parallel, electrodes, arranged in tight relationship in said supports, thus forming a tight chamber between said two supports and said two electrodes, said first electrode consisting of a thin outer foil of a material of low absorption power for the radiations, said material pertaining to the group consisting of aluminium and plastic materials, and carrying a thin deposited coating of a metal of the group consisting of iron, gold, silver, boron, caesium and photoelectric metals, said second electrode being a grid of a conductive material formed with meshes having a side up to 1 mm., said grid being applied in close vicinity of a glass plate; in said tight chamber: a gas mixture comprised of a small mount of a gaseous halogen and of at least one rare gas of the group formed by neon, krypton, argon, xenon and helium, a D.C. current source having a voltage ranging from about 50 to 500 volts, having a negative terminal connected to the thin deposited metal coating of said first electrode and a positive terminal connected to the grid of said second electrode; a pulse generator producing short pulses connected in parallel to said D.C. source, a limiting capacitor connected in parallel to said D.C. current source, the sum of the D.C. voltage and the peak voltage, delivered, respectively, by said source and said generator being such that their sum, at the instant of the passage of a pulse, is higher than the breakdown voltage of the gas enclosed in said tight chamber.

8. A system for exhibiting radiant energy by transforming said energy into light, comprising opposed, spaced electrically conductive surfaces, an atmosphere of an inert gas and comprising a small amount of a halogen between said surfaces, means for applying intermittent pulses of electric potential of greater magnitude than the breakdown potential of said gas between said surfaces so that said surfaces form a cathode and an anode, respectively, said anode being permeable to said light, said radiant energy incident on said cathode surface ejecting charged radiations upon absorption by said cathode surface, said charged radiation producing electrons in the gas, said electrons producing avalanches of electrons moving toward said anode surface under the effect of the pulsed electric field and ionizing the gas along the path of such avalanche to produce light which passes through said anode surface.

9. A system for exhibiting X-ray radiations by transforming such radiations into light, comprising opposed, spaced electrically conducting surfaces, one of said surfaces being an electrically conductive metal layer and the other surface being pervious to light, an atmosphere of an inert gas between said surfaces comprising gas selected from one or more of the group consisting of argon, neon, helium, xenon and krypton, with a small amount of iodine, means for producing pulses of electrical potential between said electrodes of greater magnitude than the breakdown potential of said gas with said metal layer as the cathode, said metal layer absorbing X-ray radiations incident thereon and ejecting electrons by the absorption of said energy, said electrons producing additional electrons along the path to the anode and forming avalanches of electrons, said ionized gas along said path emitting light which passes through said transparent electrode.

References Cited
UNITED STATES PATENTS

| | | | |
|---|---|---|---|
| 2,883,556 | 4/1959 | Jenny et al. | 250—213 |
| 2,905,829 | 9/1959 | Webb | 250—213 |
| 3,030,514 | 4/1962 | Salinger | 250—213 |
| 3,076,895 | 2/1963 | Baldwin | 250—83.1 |

RALPH G. NILSON, *Primary Examiner.*

S. ELBAUM, *Assistant Examiner.*